(12) United States Patent
Parthasarathy et al.

(10) Patent No.: US 7,769,023 B2
(45) Date of Patent: Aug. 3, 2010

(54) FIBRE CHANNEL TRAFFIC REDIRECT SCHEME USING ACCESS CONTROL LISTS

(75) Inventors: Anand Parthasarathy, Fremont, CA (US); Subrata Banerjee, Los Altos, CA (US); Murali Basavaiah, Sunnyvale, CA (US); Arpakorn Boonkongchuen, San Jose, CA (US); Parthiban Munusamy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 11/316,027

(22) Filed: Dec. 21, 2005

(65) Prior Publication Data

US 2007/0140236 A1 Jun. 21, 2007

(51) Int. Cl.
*H04L 12/28* (2006.01)
*H04L 12/56* (2006.01)
(52) U.S. Cl. .................................. 370/395.3; 370/401
(58) Field of Classification Search ......... 709/223–224; 710/61, 65; 370/218, 351, 352, 392, 395.32, 370/401
See application file for complete search history.

(56) References Cited

U.S. PATENT DOCUMENTS

| 6,876,656 | B2 * | 4/2005 | Brewer et al. | 370/392 |
|---|---|---|---|---|
| 6,885,667 | B1 * | 4/2005 | Wilson | 370/392 |
| 7,136,383 | B1 * | 11/2006 | Wilson | 370/392 |
| 7,272,640 | B1 * | 9/2007 | Kazemi et al. | 709/218 |
| 7,499,410 | B2 | 3/2009 | Dutt et al. | |
| 2003/0012204 | A1 | 1/2003 | Czeiger et al. | |
| 2003/0118053 | A1 | 6/2003 | Edsall et al. | |
| 2003/0131182 | A1 | 7/2003 | Kumar et al. | |
| 2003/0172149 | A1 | 9/2003 | Edsall et al. | |

(Continued)

OTHER PUBLICATIONS

U.S. Appl. No. 11/292,684, filed Dec. 1, 2005.

(Continued)

*Primary Examiner*—Ayaz R Sheikh
*Assistant Examiner*—Blanche Wong
(74) *Attorney, Agent, or Firm*—Weaver Austin Villeneuve & Sampson LLP

(57) ABSTRACT

Disclosed are methods and apparatus for redirecting fiber channel data that is transmitted between a first and a second node, such as a host and target, in a storage area network (SAN) to an intelligent node that facilitates implementation of a service on such redirected data. Such redirection is provided transparently with respect to the first and second nodes without significantly reconfiguring the existing infrastructure of the first and second nodes. In a specific Fiber Channel implementation, the redirection is accomplished without rewiring any of the nodes in the network fabric or reconfiguring zones or virtual storage area networks (VSANs). In general, such redirection is accomplished by rewriting the data as it traverses on a path between the first and second node towards an original destination (e.g., the first or second node) so that the data is redirected to an intelligent node. The intelligent node then facilitates implementation of a service on such redirected data and then forwards the serviced data back to its original destination. In one example, setup of this redirection function is accomplished simply by making a request to a network device (e.g., a host and/or target switch) in the first and second node's communication path, where the request identifies the first node, the second node, and the intelligent node.

30 Claims, 6 Drawing Sheets

U.S. PATENT DOCUMENTS

| | | |
|---|---|---|
| 2004/0024908 A1 | 2/2004 | Valdcvit et al. |
| 2004/0030857 A1 | 2/2004 | Krakirian et al. |
| 2004/0230817 A1* | 11/2004 | Ma .............................. 713/193 |
| 2005/0018673 A1 | 1/2005 | Dropps et al. |
| 2005/0025075 A1 | 2/2005 | Dutt et al. |
| 2005/0036499 A1 | 2/2005 | Dutt et al. |
| 2006/0010341 A1 | 1/2006 | Kodama |
| 2006/0041559 A1 | 2/2006 | Baldwin et al. |
| 2006/0072587 A1 | 4/2006 | Ramaswamy et al. |
| 2006/0092932 A1 | 5/2006 | Ghosh et al. |

OTHER PUBLICATIONS

Office Action dated Oct. 3, 2008 for U.S. Appl. No. 11/292,684.

Monia et al., RFC-4172, "iFCP—A Protocol for Internet Fibre Channel Storage Networking", Sep. 2005.

Gibbons et al., RFC 4369, "Definitions of Managed Objects for Internet Fibre Channel Protocol (ifCP)", Jan. 2008.

Brocade, x-Path OS, Administrator's Guide, Publication No: 53-1000177-01, Publication Date Jan. 26, 2005.

Dutt et al., "Fibre Channel Switch That Enables End Devices in Different Fabrics to Communicate With One Another While Retaining Their Unique Fibre Channel Domain_IDS", U.S. Appl. No. 10/791,143, filed on Mar. 1, 2004.

Office Action dated Mar. 26, 2009 for U.S. Appl. No. 11/292,684.

* cited by examiner

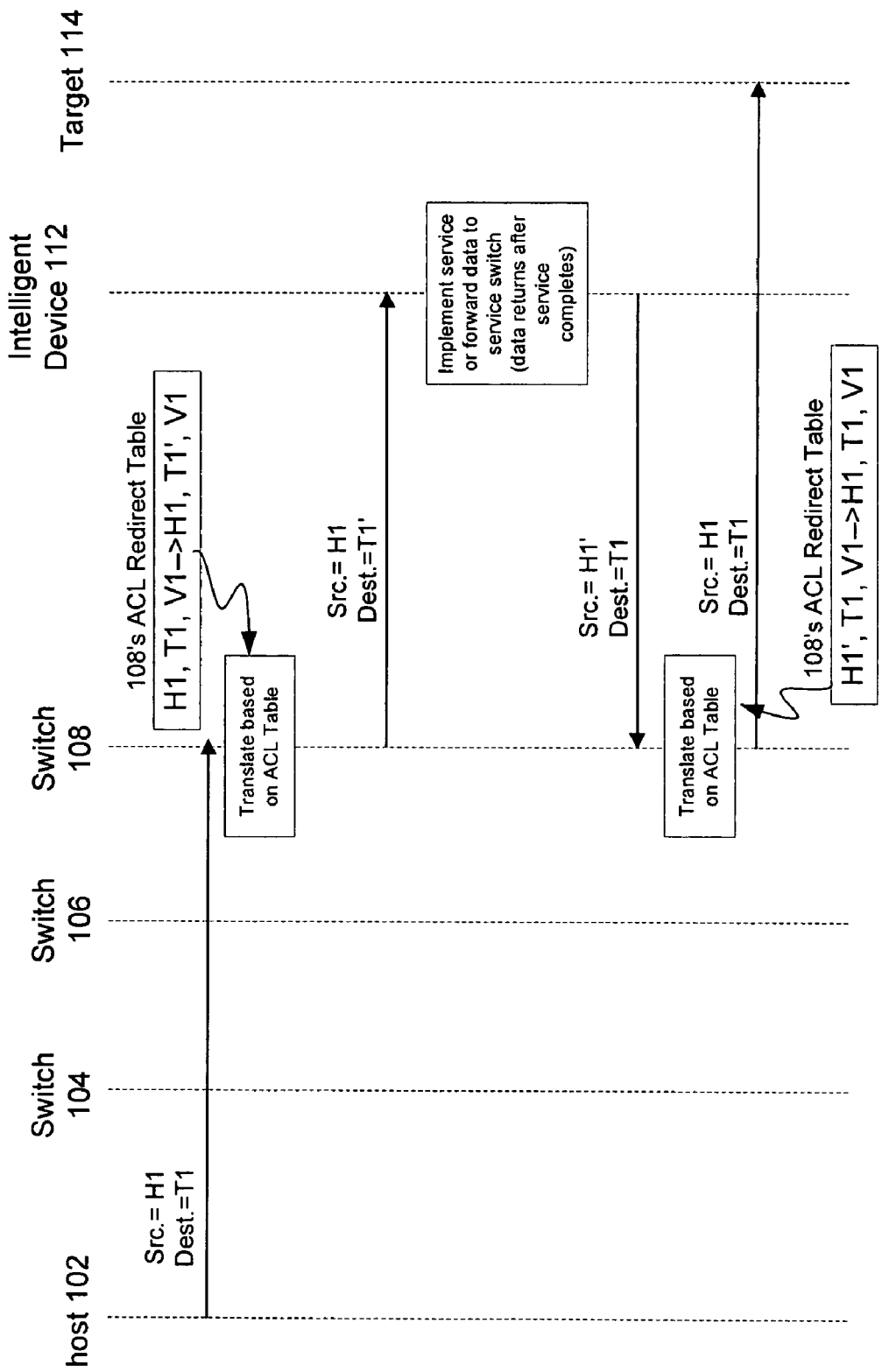

FIBRE CHANNEL TRAFFIC REDIRECT SCHEME USING ACCESS CONTROL LISTS

BACKGROUND OF THE INVENTION

The present invention relates to storage area networks. More particularly, the present invention relates to methods and apparatus to facilitate certain intelligent services with respect to data flowing between a host and a storage device, or the like.

In recent years, the capacity of storage devices has not increased as fast as the demand for storage. Additionally, a host may wish to use multiple storage devices because it needs tiered and heterogeneous storage or because storage management facilities are needed for reasons specific to the storage environment. For example, it may be desirable to use database tables on a fast storage device, and other tables on a slower or less expensive storage device.

In order to solve these storage limitations, the storage area network (SAN) was developed. Generally, a storage area network is a high-speed special-purpose network that interconnects different data storage devices and associated data hosts on behalf of a larger network of users.

In general, a host accesses one or more storage devices so that traffic is flowing between the host and each storage device via an existing infrastructure of switches. In certain situations, it may be useful to provide certain intelligent services to the data traffic flow between a particular host and storage device and it may be preferable to implement such intelligent services on a switch or appliance device that is not in the existing infrastructure or data path that is located between the host and the storage device. For example, the switches that are positioned in a path of a particular host and storage device pair may not have the necessary intelligence, either hardware or software, to implement such a service. Additionally, one may wish to avoid rewiring of the infrastructure between the serviced host and storage device pair so as to not incur significant time, increased complexity, and temporary loss of communication. In another example, it may be desirable to locate a service in a remote location from the data path between a host and storage device pair.

Accordingly, it would be beneficial to provide a mechanism for redirecting the data flow within the SAN to implement these intelligent services. Examples of such intelligent services may include Encryption, Data Migration or SAN Tapping. It would also be desirable to seamlessly provide such redirection with minimal setup by a user.

SUMMARY OF THE INVENTION

The present invention provides methods and apparatus for redirecting fibre channel data that is transmitted between a first and a second node, such as a host and target, in a storage area network (SAN) to an intelligent node that facilitates implementation of a service on such redirected data. Such redirection is provided transparently with respect to the first and second nodes without significantly reconfiguring the existing infrastructure of the first and second nodes. In a specific Fibre Channel implementation, the redirection is accomplished without rewiring any of the nodes in the network fabric or reconfiguring zones or virtual storage area networks (VSANs). In general, such redirection is accomplished by rewriting the data as it traverses on a path between the first and second node towards an original destination (e.g., the first or second node) so that the data is redirected to an intelligent node. The intelligent node then facilitates implementation of a service on such redirected data and then forwards the serviced data back to its original destination. In one example, setup of this redirection function is accomplished simply by making a request to a network device (e.g., a host and/or target switch) in the first and second node's communication path, where the request identifies the first node, the second node, and the intelligent node.

In one embodiment, a method of redirecting fibre channel data that is being transmitted between two or more nodes of a storage area network is disclosed. In operation (a), a request is received to redirect data that is transmitted between a first node and a second node in a storage area network to a particular intelligent node. The intelligent node is configured to implement a service on the redirected data. In an operation (b), one or more binding(s) for the requested redirection are retained. Each binding for the requested redirection specifies a source identifier for the first node or the second node, a destination identifier for the first node or the second node, and a destination identifier for the intelligent node that provides certain services. In an operation (c), data that is transmitted between the first node and the second node is redirected based on the retained one or more binding(s).

In a specific implementation, the service is selected from a group consisting of encryption, data tapping, and data migration. In another aspect, the first node is in the form of a host and the second node is in the form of a storage area device. In a further feature, the host is defined as an initiator and the storage area node is defined as a target. In another implementation, the redirection is accomplished transparently with respect to the first and second nodes without significantly reconfiguring the existing infrastructure that is present between the first and second nodes.

In a specific embodiment, the Fibre Channel protocol is implemented in the storage area network and the redirection is accomplished without rewiring of the storage area network's fabric or reconfiguring the zones or virtual storage area networks (VSANs). In yet another embodiment, the intelligent node is configured to receive the redirected data and apply a service on such received data.

In a specific implementation, operations (a) through (c) are implemented by a network device that is associated with the storage device and the binding(s) include (i) a first binding having a source identifier for the host, a destination identifier for the storage device, and a destination identifier for the intelligent node and (ii) a second binding having a source identifier for the storage device, a destination identifier for the host, and a destination identifier for the intelligent node. In further aspect, the first and second bindings are propagated to all network devices in the storage area network, and such propagation may be accomplished utilizing the Cisco Fabric Services (CFS) protocol.

In another implementation, operations (a) through (c) are implemented by a network device that is associated with the storage device and the binding(s) for the request includes only a single binding having a source identifier for the storage device, a destination identifier for the host, and a destination identifier for the intelligent node. In yet another implementation, operations (a) through (c) are implemented by a network device that is associated with the host and the binding(s) for the request include only a single binding having a source identifier for the storage device, a destination identifier for the host, and a destination identifier for the intelligent node.

In another embodiment, the invention pertains to an apparatus operable to redirect fibre channel data that is being transmitted between two or more nodes of a storage area network. The apparatus includes one or more processors and one or more memory. At least one of the memory and processors are adapted to provide at least some of the above described method operations.

In an alternative embodiment, the invention pertains to a system having a storage area network (SAN) having a plurality of network devices and a plurality of storage devices which are each accessible by one or more hosts through at least one of the network devices and an intelligent device for implementing a service on traffic for a particular host and target and that is configured with a virtual host and virtual target pair corresponding to the particular host and target whose traffic is to be redirected. The intelligent device is operable to cause an access control list (ACL) table to be set up in a target network device from the plurality of network devices that is coupled to the particular target so that traffic traversing between the particular host and the particular target is redirected to the intelligent device associated with the virtual host and virtual target pair. The intelligent device is further operable to receive traffic that is redirected from the target network device, facilitate a service for such redirected traffic, and forward the serviced traffic back to its original destination.

In one specific aspect, the intelligent device is part of a same virtual SAN as the particular target. In another aspect, the particular host is part of a same virtual SAN as the particular target. In yet another embodiment, the particular host is part of a different virtual SAN than the particular target. In another aspect, the intelligent device is part of a different virtual SAN than the particular target. In another embodiment, the intelligent device is integrated with a one of the network devices.

These and other features of the present invention will be presented in more detail in the following specification of the invention and the accompanying figures which illustrate by way of example the principles of the invention.

BRIEF DESCRIPTION OF THE DRAWINGS

FIG. 4A is a communication diagram of data being sent from the host to the target of FIG. 1 in accordance with one example implementation of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
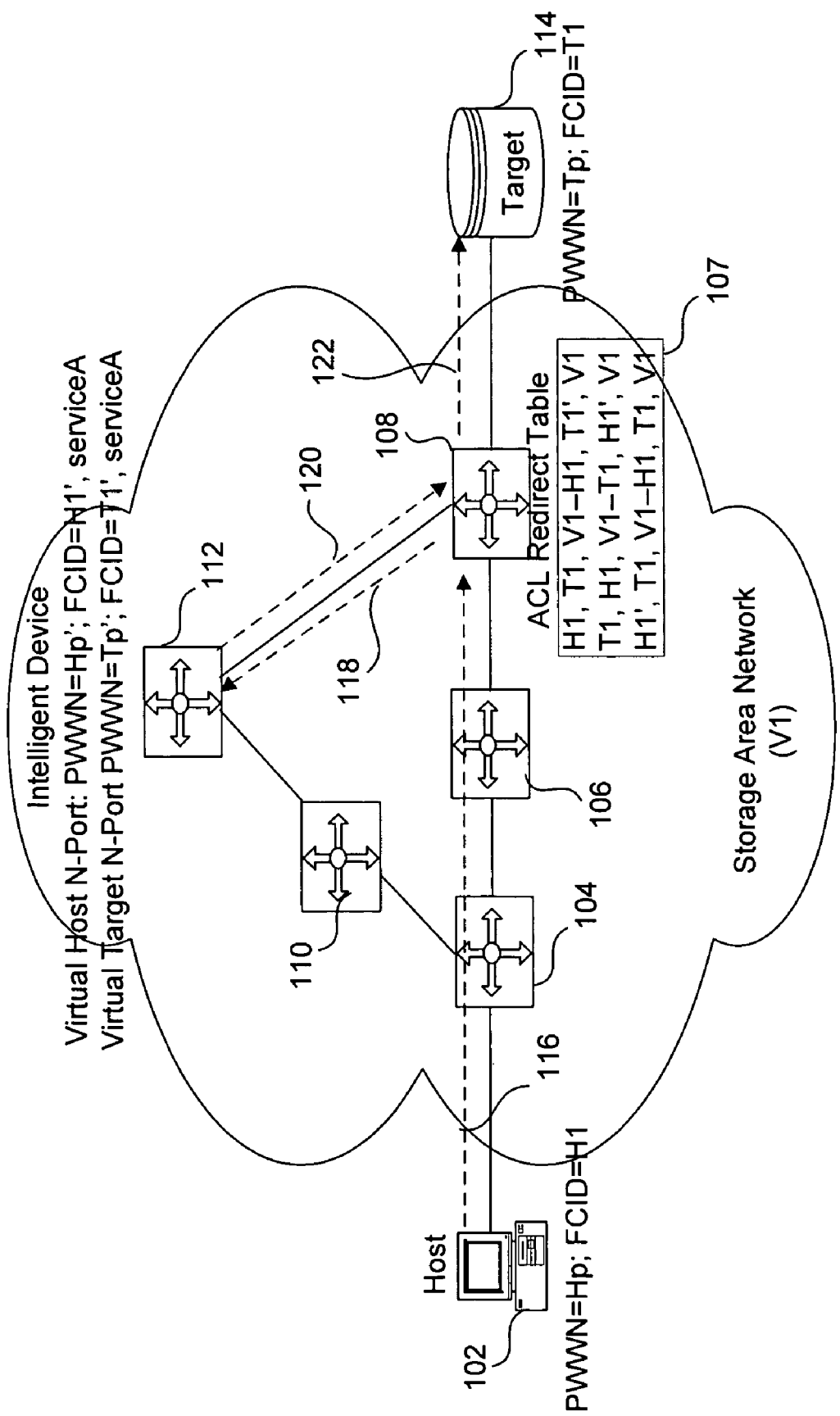
FIG. 1 is a block diagram illustrating an exemplary storage area network (SAN) in which various embodiments of the invention may be implemented.

FIG. 1 is a block diagram illustrating an exemplary storage area network (SAN) 100 in which various embodiments of the invention may be implemented. The configuration of FIG. 1 will also be used to illustrate the inventive mechanisms described below. The SAN 100 includes one or more storage devices and network devices or switches. As shown, the SAN 100 includes target 114, and switches 104, 106, 108, 110, and 112.

In general, a host 102 may access a target or storage device 114 of SAN 100 through one or more switch(es). Host 102 may access target 114 through one or more paths that include the host's switch 104 and the target's switch 108. For example, host 102 may access target 114 through switches 104, 106, and 108. Of course, FIG. 1 represents merely a simple example of a SAN fabric in which techniques of the present invention may be practiced. The fabric may have any number of Virtual SANs (VSANs) that include any number and type of host and storage devices or virtual devices. In the illustrated embodiment, SAN 100 is also represented as a virtual SAN (VSAN) V1. VSAN V1 may be coupled to other VSANs (not shown) through one or more border switches.

In Fibre Channel (FC), each device (hosts, storage devices and switches) is identified by a globally unique, eight (8) byte wide World Wide Name (WWN) assigned by the manufacturer. When the Fibre Channel devices are interconnected to form a SAN or VSAN, the WWN (along with other parameters) is the primary mechanism to uniquely identify each device. Fibre Channel frames are used for communication among the devices in the SAN. The WWN, however, is not used by the frames. Each device must login to the FC fabric and is then dynamically assigned a unique Fibre Channel address (FCID) by the Fabric. The FCID is used in FC networks for end devices to communicate with each other. For the devices of FIG. 1, host 102 has PWWN=Hp and FCID=H1; target 114 has PWWN=Tp and FCID=T1. Each switch and port of each switch will also have an associated WWN and FCID as discussed further below.

An intelligent device 112 may also be provisioned or present in the same SAN 100 as the host 102 and target 114 or provisioned or present in a different SAN as will be described further below. The intelligent device 112 is set up to facilitate one or more services to be performed on traffic between specific hosts and targets. The intelligent device 112 may be integrated into a switch (as shown) or provided as an appliance device (not shown) that resides in or outside the SAN. In either case, traffic that flows between a specific host and target pair is redirected to the intelligent device such that a service can be provided for such redirected traffic before releasing the traffic back to the host or target.

Any suitable mechanism may be utilized to redirect traffic between a particular host and storage device to a particular intelligent device. In one implementation, one or more of the switches that are in a path between the particular host and the target pair may be configured with an ACL (access control list) redirect table that is used to redirect traffic received into such switch from the host/target to the intelligent device. The switch associated with the particular host and/or the switch associated with the particular target are preferably configured for redirection since these two switches will always receive data that is sent between the host and target. That is, the data may take different paths between the host and target, but will always pass through the host's associated switch and the target's associated switch.

Figure 4B:
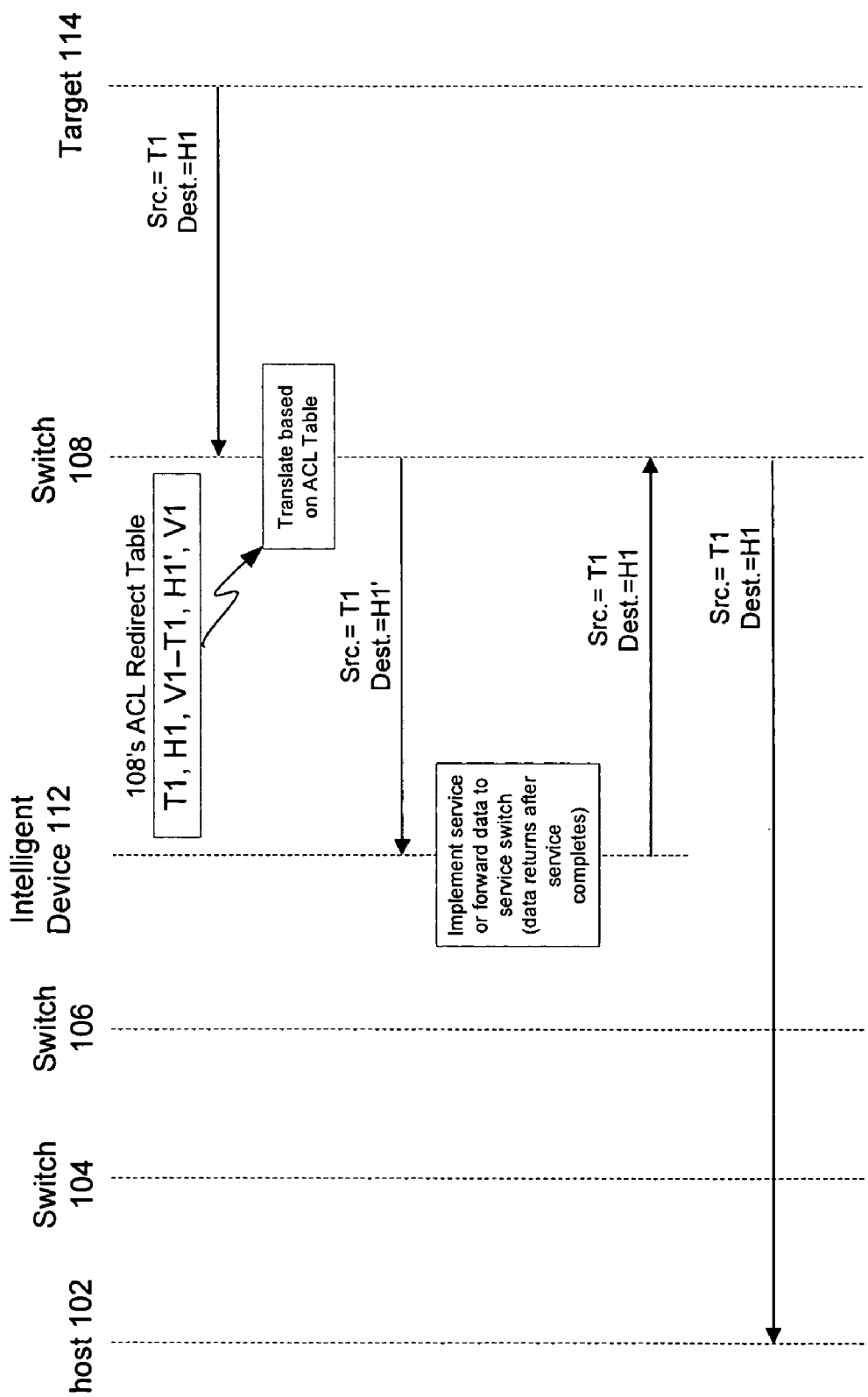
FIG. 4B is a communication diagram showing data being sent from the target to the host of FIG. 1 in accordance with another example implementation of the present invention.

In one embodiment, only the particular target's associated switch is configured with an ACL redirect table for redirecting traffic between a particular host and the particular target. As shown, the switch 108 that is coupled to target 114 includes an ACL redirect table 107. This redirect table 107 may be used by the target switch 108 to redirect traffic that is traversing between the host 102 and target 114 in either direction to the intelligent device 112. For example, data sent from host 102 along path 116 travels through host switch 104 and switch 106 to target switch 108. The target switch 108 then uses its ACL redirect table 107 to redirect the data along path 118 to the intelligent device 112. The intelligent device then implements a service on the redirected data. The serviced data is then sent from the intelligent device 112 along path 120 back to target switch 108. The target switch 108 then sends the data to its original destination target 114. Data may also be sent from the target 114 to host 102 and be redirected to intelligent device 112 as shown in FIG. 4B.

Figure 2:
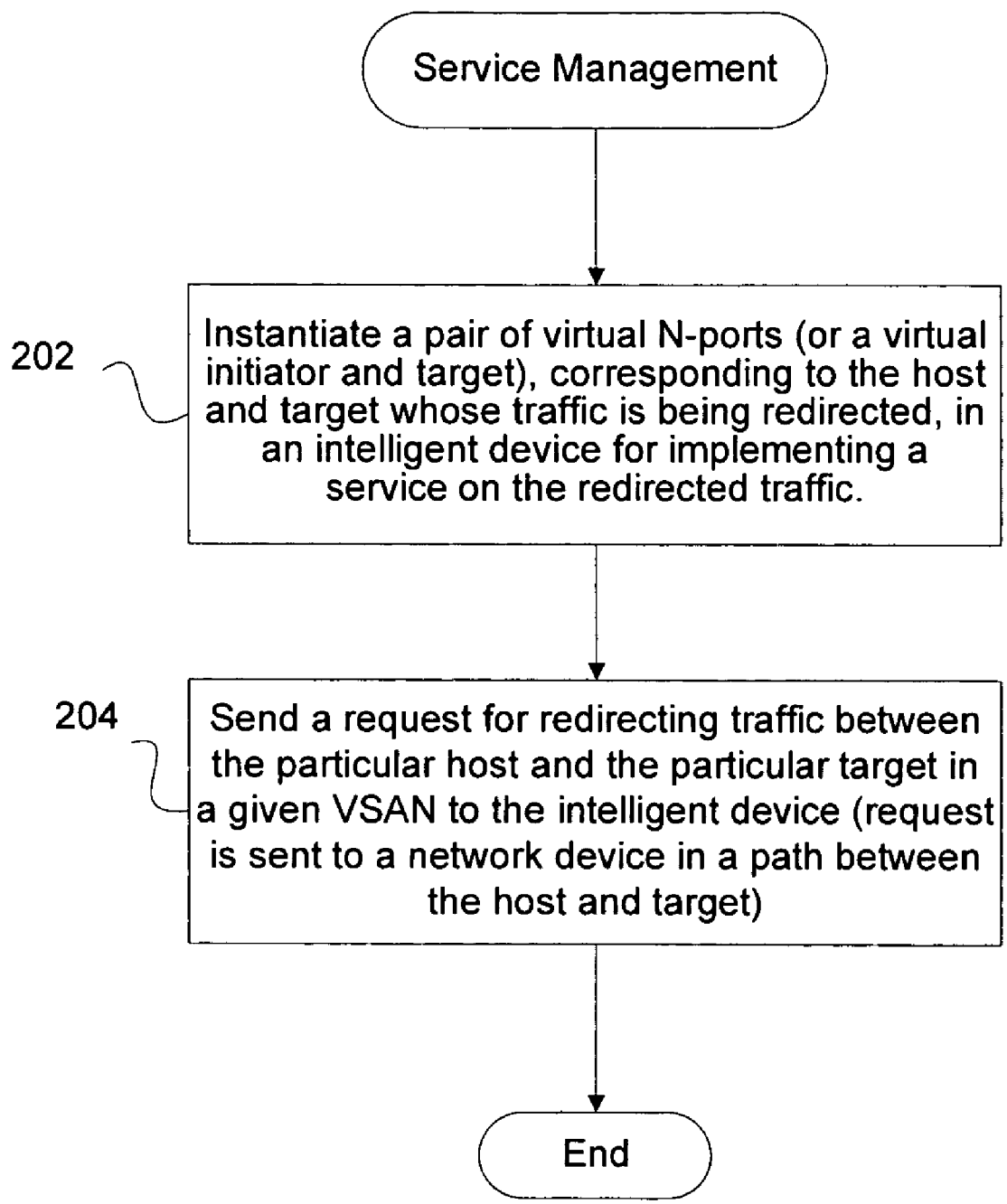
FIG. 2 is a flow chart illustrating a traffic redirection procedure in accordance with one embodiment of the present invention.

Any suitable mechanism may be utilized to set up redirection for traffic flowing between a particular host and target to a intelligent device. FIG. 2 is a flow chart illustrating a traffic redirection procedure 200 in accordance with one embodiment of the present invention. This procedure 200 may be implemented to facilitate a service for a particular host and target pair and repeated for any number and types of services and host and target pairs. Initially, a pair of virtual N-ports (or a virtual initiator or target), corresponding to the host and target whose traffic is to be redirected, are instantiated in a intelligent device that is configured to implement a service in operation 202. For example, a virtual PWWN is assigned to each of the virtual initiator and the virtual target, and each virtual entity obtains a corresponding FCID.

A different set of virtual host and target ports may be set up for each host and target pair and service to be implemented on the traffic for such host and target pair. For example, a first virtual host and target port pair is set up for a first host and target pair and a first service; and a second virtual host and target port pair is set up for a different second host and target pair and different second service or a same service. Alternatively, a single virtual host and target port pair may be set up for multiple services for traffic between a particular host and target pair.

Instantiation of the pair of virtual N-ports (or a virtual initiator or target), corresponding to the host and target whose traffic is being redirected, may be accomplished in any suitable manner. Several embodiments for creating virtual N-ports, virtual initiators, and virtual targets are further described in co-pending U.S. Patent Applications (1) application Ser. No. 10/056,238 entitled "METHODS AND APPARATUS FOR IMPLEMENTING VIRTUALIZATION OF STORAGE WITHIN A STORAGE AREA NETWORK" filed 23 Jan. 2002 by Thomas James Edsall et al. and (2) application Ser. No. 10/045,883 entitled "METHODS AND APPARATUS FOR IMPLEMENTING VIRTUALIZATION OF STORAGE WITHIN A STORAGE AREA NETWORK THROUGH A VIRTUAL ENCLOSURE" filed 9 Jan. 2002 by Sanjaya Kumar et al., and (3) "Cisco MDS 9000 Family Configuration Guide, Cisco MDS SAN-OS Release 1.1(1a)", Cisco Systems, Inc., January 2004, http://www.cisco.com. This document and patent applications are incorporated herein by reference in their entirety.

A request for redirecting traffic between the particular host and the particular target in a given VSAN to the intelligent device is then sent to a network device (e.g., to its FC Redirect module) that is in a path between the particular host and target in operation 204. In the present illustrated implementation, the intelligent device is integrated within the switch that is making the request for redirection so the intelligent device itself is sending the request. However, the intelligent device can be instantiated in an appliance device that is separate from the switch making the request. That is, the virtual N-port pair is instantiated in an appliance or switch that differs from the switch sending the request for redirecting traffic. In this later case, the traffic is redirected to the appliance or switch that corresponds to the virtual N-port pair indicated in the request.

In the example implementation of FIG. 1, a request for redirecting traffic between host 102 and target 114 is sent from intelligent device 112 to target switch 108. Alternatively, a request may be sent to the host switch 104 if the FC redirect function exists in the host switch 104. The procedure 200 then ends.

In the intelligent switch 112, a pair of virtual N-ports (or a virtual initiator or target), corresponding to the host and target whose traffic is being redirected, is setup. As shown, virtual target N-port has PWWN=Hp' and an FCID=H1' and a virtual host N-port has PWWN=Tp' and an FCID=T1'. Each of these virtual N-ports are associated with the corresponding host and target, whose traffic is directed and the services that need to be applied on the traffic flow. For example, a table may be set up in intelligent switch 112 that lists each virtual target and host port pair's FCIDs and one or more services that are to be implemented for traffic redirected to such virtual target and host port pair. The intelligent switch 112 also includes information regarding where the redirected data should be routed after a service is applied. For example, an ACL Redirect Table is also provided for the intelligent switch 112 for sending serviced data back to its original destination.

Figure 3:
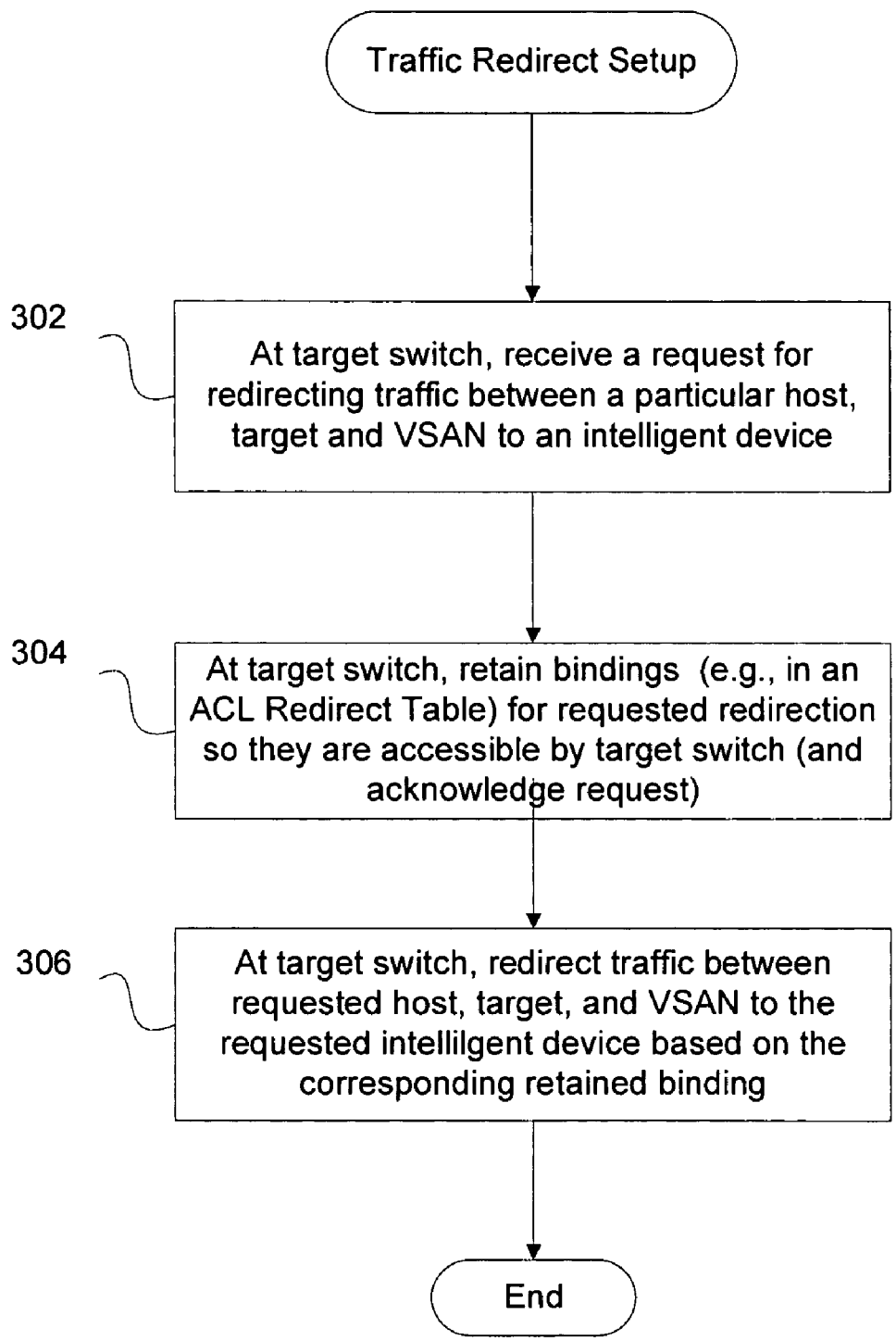
FIG. 3 is a flowchart illustrating a procedure for setting up a traffic redirect scheme in accordance with one implementation of the present invention.

After a request is received by a host or target switch, any suitable mechanisms may be implemented to set up redirection in such host or target switch. FIG. 3 is a flowchart illustrating a procedure 300 for setting up a traffic redirect scheme in accordance with one implementation of the present invention. In the example of FIG. 1, a redirection mechanism is set up only in the target switch 108. Alternatively, a redirection mechanism may be set up in both the host switch 104 and the target switch 108 or only in the host switch 104. In the illustrated example, at the target switch a request for redirecting traffic between a particular host, target and VSAN to an intelligent device is received in operation 302. This request specifies a host and target whose traffic is to be redirected, and their VSAN, as well as which intelligent device is to receive the redirected traffic.

At the target switch, bindings for the requested redirection are retained so that these bindings are accessible by the target switch in operation 304. For instance, the bindings are retained in ACL redirect table 107 of target switch 108. An acknowledgement of the request may also be sent back to the requesting switch in this step. At the target switch, traffic between the requested host, target, and VSAN is then redirected to the requested intelligent device based on the corresponding retained binding in operation 306. The procedure 300 then ends.

In the example of FIG. 1, the ACL Redirect Table 107 of target switch 108 includes three bindings. Each binding matches a particular source and destination pair (and VSAN) to a virtual host or target port. In the present example, the first binding includes a source identifier for host 102 in the form of FCID H1, a destination identifier for target 114 in the form of FCID T1, an identifier of the VSAN V1 associated with the host and target, an identifier for the corresponding virtual target port in the form of FCID T1', and an identifier of the VSAN V1 associated with the virtual target. When data having a source FCID H1, destination FCID T1, and VSAN identifier V1 is received into target switch 108, the source and destination of such data corresponds to the first binding in ACL Redirect Table 107. The target switch 108 then uses this first binding to replace the data's destination with the corresponding destination T1' and the VSAN identifier with the corresponding VSAN identifier V1 for virtual target port. Likewise, the second binding includes a source identifier for target 114 in the form of FCID T1, a destination identifier for host 102 in the form of FCID H1, an identifier of the VSAN V1 associated with the host and target, an identifier for the corresponding virtual host port in the form of FCID H1', and an identifier of the VSAN V1 associated with the virtual host port. Thus, data having a source T1, destination H1, and VSAN V1 is translated into data having a source T1, destination H1', and VSAN V1.

For a target switch that is configured to redirect traffic from both a host and target, the first binding for redirecting traffic from the host is applied to all ports of the target switch since data destined for the target may come into any port of the target switch. In contrast, the second binding for redirecting traffic from the target need only be applied to the target port. Accordingly, data that is coming back from the intelligent node (after a service is applied) cannot use the original host's identifier H1 or the target switch will redirect the data back to the intelligent device in an infinite loop. Thus, data that is being sent from the intelligent device will use the virtual host identifier H1'. In contrast, data that is being sent from the virtual target can use source identifier T1 since the second binding is not going to be applied to the port receiving data from the intelligent device. For data returning from the virtual host H1', the target switch needs a third binding for replacing this source identifier H1' with the original host identifier H1. Accordingly, a third binding includes a source identifier for the virtual host in the form of FCID H1', a destination identifier for target 114 in the form of FCID T1, an identifier of the VSAN V1 associated with the virtual host and target, an identifier for the corresponding host 102 in the form of FCID H1, and an identifier of the VSAN V1 associated with the host. This third binding is not needed if redirection is implemented in both the host and target switch or if the intelligent node is co-located in the target switch.

If the service and its corresponding virtual initiator and target disappears from the fabric, the FC redirect functionality may start an aging process. For some services, it may be set to infinity, which generally means that the traffic flow is disrupted permanently until the intelligent node resumes. For other services, the binding could be removed from the ACL Redirect Table after the service ages out so that normal traffic flow is resumed.

FIG. 4A is a communication diagram of data being sent from host 102 to target 114 in accordance with one example implementation of the present invention. Host 102 sends data having a source identifier equal to H1 and a destination identifier equal to T1 towards target 114. In a Fibre Channel implementation, the source and destination identifiers correspond to FCIDs of the sending host and receiving target, respectively. The data then traverses through switch 104 and switch 106 to switch 108. The switch 108 then translates the data based on its ACL Redirect Table. The translated data then has a source identifier equal to H1 and a destination identifier equal to T1'. This T1' identifier corresponds to a virtual N-port of a virtual target in the intelligent device 112. Accordingly, the translated data is then sent from switch 108 to intelligent device 112. The intelligent device 112 then implements a service or forwards the data to another service switch, which then returns the data after the service completes. The intelligent device 112 then forwards data having a source identifier equal to H1' and a destination identifier equal to T1 back to switch 108. The switch 108 then translates the data based on its ACL Redirect Table, and the translated data has source identifier equal to H1 and destination identifier equal to T1. The destination identifier T1 corresponds to the original destination target 114. Thus, the data is routed from switch 108 to target 114.

FIG. 4B is a communication diagram showing data being sent from target 114 to host 102 in accordance with the previous example implementation of the present invention. Target 114 sends data having a source identifier equal to T1 and a destination identifier equal to H1 to target switch 108. The target switch 108 then translates this data based on its ACL Redirect Table 107. This translation results in the destination identifier H1 being replaced by H1', which corresponds to a virtual N-port of a virtual host in the intelligent device 112. Thus, the translated data is redirected to the intelligent device 112. A service is implemented on the redirected data or the data is forwarded to another service switch, which then returns the data to intelligent device after the service completes. After a particular service is applied to the redirected data, the data is then sent back to its original destination. Accordingly, the service data now includes a source identifier equal to T1 and a destination identifier equal to H1, which corresponds to host 102. Thus, the data may be routed from intelligent device 112 to switch 108 and then to its original destination host 102 through switch 106 and host switch 104. Alternatively, the data may be routed from intelligent device 112 to host 102 through switches 110 and 104.

In further implementations, the bindings of the ACL Redirect Table information, as well as other timing information, may be propagated in the form of FC redirect binding information throughout the fabric. The FC redirect information may be propagated through the switches in the fabric to allow migration of hosts and targets across switches (e.g., due to some fabric reconfiguration by the user).

The propagation of FC Redirect binding information may be implemented in any suitable manner, such as utilizing the Cisco Fabric Services (CFS). CFS generally provides a mechanism for sending any type of data to all switches in the entire fabric. The CFS message generally contains a field indicating that it includes data that should be sent throughout the fabric and an application field indicating the use of such data. For example, the application field will indicate that this is an "FC Redirect" application. When a switch receives a CFS message having an "FC Redirect" application, it then retains this information for setting up a binding in an ACL Redirect Table if a matching host or target log into such switch. The host/switch may also move to another switch, and this process may trigger setup of an ACL Redirect Table in the new host/target switch.

The host and target do not have to reside in a same VSAN in order to practice the redirection techniques of the present invention. Techniques for propagating the presence of a host/target into another target/host's VSAN to allow inter-VSAN routing may also be utilized with the present redirection techniques. Several embodiments of an inter-VSAN scheme are further described in co-pending U.S. patent application Ser. No. 11/292,684, entitled "INTER-VSAN ROUTING WITH NAT", filed 1 Dec. 2005 by Ankur Jain et al., which application is incorporated by reference in its entirety. If the appliance is in the same VSAN as the target's VSAN, it may be implemented by creating the FC redirect bindings in the target VSAN.

The techniques of the present invention may be implemented in any suitable combination of hardware and software. For example, they can be implemented in an operating system kernel, in a separate user process, in a library package bound into network applications, on a specially constructed machine, or on a network interface card. In a specific implementation, they are implemented on a fabric switch of a storage area network.

In one implementation, the switch includes at least one memory device and at least one processor. The memory and processor are operable to perform any of the above described techniques, as well as standard switching/routing operations, virtualization management, zone management, etc.

Figure 5:
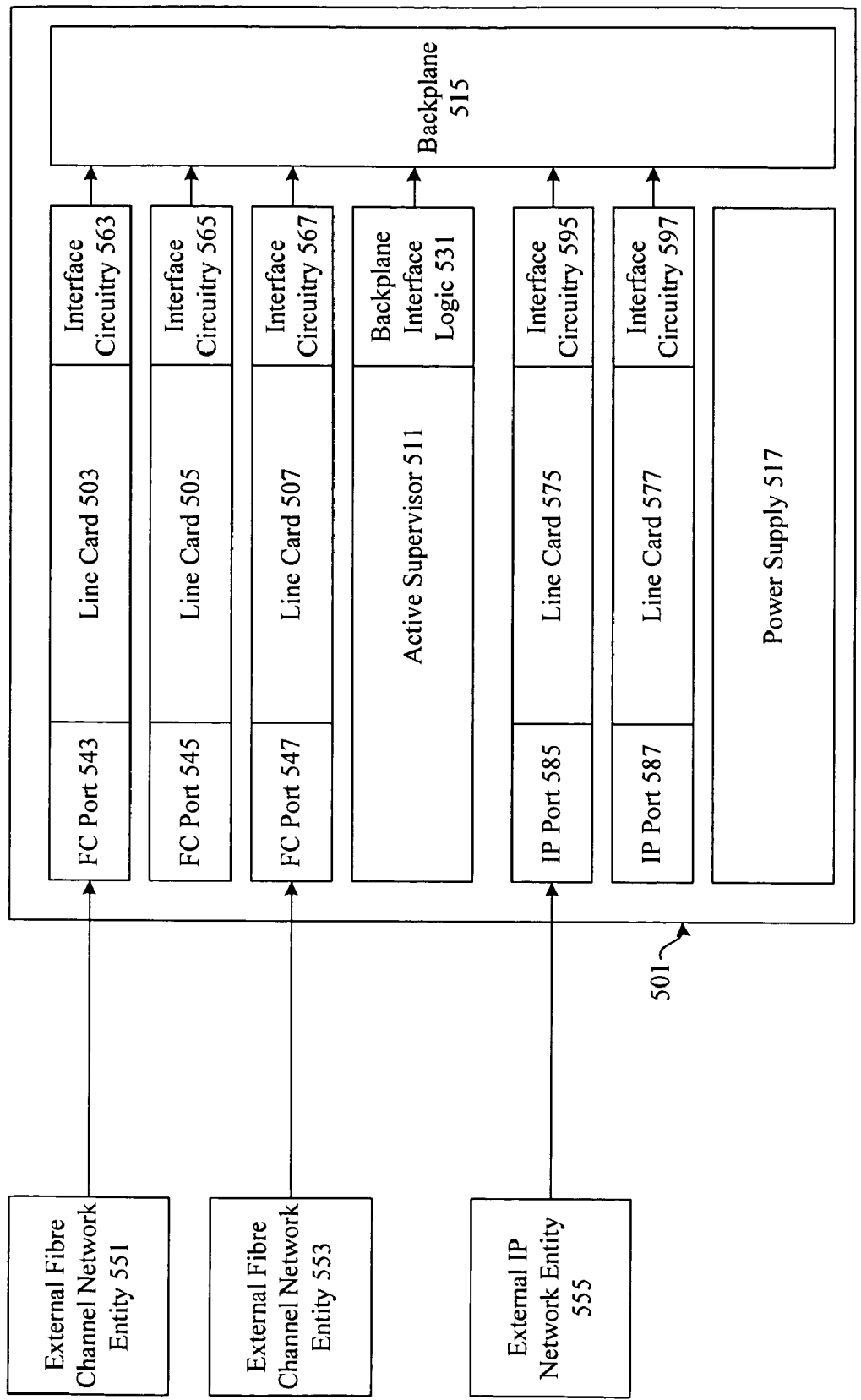
FIG. 5 is a diagrammatic representation of one example of a Fibre Channel switch that can be used to implement techniques of the present invention.

FIG. 5 is a diagrammatic representation of one example of a fibre channel switch that can be used to implement techniques of the present invention. Although one particular configuration will be described, it should be noted that a wide variety of switch and router configurations are available. The switch 501 may include one or more supervisors 511 and power supply 517. According to various embodiments, the supervisor 511 has its own processor, memory, and storage resources.

Line cards 503, 505, and 507 can communicate with an active supervisor 511 through interface circuitry 563, 565, and 567 and the backplane 515. According to various embodiments, each line card includes a plurality of ports that can act as input or output ports for communication with external fibre channel network entities 551 and 553. The backplane 515 can provide a communications channel for all traffic between line cards and supervisors. Individual line cards 503 and 507 can also be coupled to external fibre channel network entities 551 and 553 through fibre channel ports 543 and 547.

External fibre channel network entities 551 and 553 can be nodes such as other fibre channel switches, disks, RAIDS, tape libraries, or servers. The fibre channel switch can also include line cards 575 and 577 with IP ports 585 and 587. In one example, IP port 585 is coupled to an external IP network entity 555. The line cards 575 and 577 also have interfaces 595 and 597 to the backplane 515.

It should be noted that the switch can support any number of line cards and supervisors. In the embodiment shown, only a single supervisor is connected to the backplane 515 and the single supervisor communicates with many different line cards. The active supervisor 511 may be configured or designed to run a plurality of applications such as routing, domain manager, system manager, and utility applications. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

Regardless of fabric switch's configuration, it may employ one or more memories or memory modules configured to store data, database(s), and program instructions for the general-purpose network operations and/or the inventive techniques described herein. The program instructions may control the operation of an operating system and/or one or more applications, for example. The memory or memories may also be configured to store ACL Redirect tables and information, topology maps, routing information, service lists, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, one can extend this FC redirect scheme to cascade through a set of nodes, each of which can sequentially implement a particular service. Therefore, the described embodiments should be taken as illustrative and not restrictive, and the invention should not be limited to the details given herein but should be defined by the following claims and their full scope of equivalents.

What is claimed is:

1. A method of redirecting data that is being transmitted between two or more nodes via a network device of a storage area network, the method comprising:

(a) at a first network device, receiving a request to redirect data that is transmitted between a first node and a second node in a storage area network, wherein the data destined for the second node is redirected to a particular intelligent node, wherein the particular intelligent node is configured to implement a service on the redirected data or forward the redirected data to another node that implements such service, wherein the request includes an identifier for each of the first node, the second node, and the particular intelligent node;

(b) for the first network device retaining one or more bindings for the requested redirection based on the received identifiers for the first node, the second node, and the particular intelligent node, wherein the one or more bindings are associated with the received identifiers for the for the first node, the second node and the particular intelligent node, wherein the one or more bindings include at least one binding having a source identifier for a one of the first node or the second node, a destination identifier for another one of the first node or the second node, and a destination identifier for the particular intelligent node; and (c) redirecting the data to the particular intelligent node based on the retained one or more bindings.

2. A method as recited in claim 1, wherein the service includes encryption, data tapping, or data migration.

3. A method as recited in claim 1, wherein the first node is in the form of a host and the second node is in the form of a storage area device.

4. A method as recited in claim 3, wherein the host is defined as an initiator and the storage area node is defined as a target.

5. A method as recited in claim 3, wherein the first network device is associated with the storage area device and the one or more bindings include (i) a first binding having a source identifier for the host, a destination identifier for the storage area device, and a destination identifier for the particular intelligent node and (ii) a second binding having a source identifier for the storage area device, a destination identifier for the host and a destination identifier for the particular intelligent node.

6. A method as recited in claim 5, further comprising propagating the first and second bindings to all network devices in the storage area network.

7. A method as recited in claim 6, wherein such propagation is accomplished utilizing a Cisco Fabric Services (CFS) protocol.

8. A method as recited in claim 3, wherein the first network device is associated with the storage device and the bindings for the request includes only a single binding having a source identifier for the storage device, a destination identifier for the host, and a destination identifier for the particular intelligent node.

9. A method as recited in claim 3, wherein the first network device is associated with the host and the bindings for the request include only a single binding having a source identifier for the storage device, a destination identifier for the host, and a destination identifier for the particular intelligent node.

10. A method as recited in claim 1, wherein the redirection is accomplished transparently with respect to the first and second nodes without significantly reconfiguring the existing infrastructure that is present between the first and second nodes.

11. A method as recited in claim 1, wherein a Fibre Channel protocol is implemented in the storage area network and the redirection is accomplished without rewiring of the storage area network's fabric, configuring a new zone for such fabric, or configuring a new virtual storage area network (VSAN) arrangement.

12. A method as recited in claim 1, wherein the request is received from a second network device so as to redirect data to such second network device and the identifier for the particular intelligent node equals an identifier of such second network device.

13. A method as recited in claim 1, wherein the request is received from a second network device that is a separate device from the particular intelligent node.

14. A apparatus in the form of a first network device for redirecting data that is being transmitted between two or more nodes via a network device of a storage area network, comprising:
one or more processors;
one or more memory, wherein at least one of the processors and memory are adapted for:
(a) at the first network device, receiving a request to redirect data that is transmitted between a first node and a second node in a storage area network, wherein the data destined for the second node is redirected to a particular intelligent node, wherein the particular intelligent node is configured to implement a service on the redirected data or forward the redirected data to another node that implements such service, wherein the request includes an identifier for each of the first node, the second node, and the particular intelligent node;
(b) for the first network device retaining one or more bindings for the requested redirection based on the received identifiers for the first node, the second node, and the particular intelligent node, wherein the one or more bindings are associated with the received identifiers for the for the first node, the second node and the particular intelligent node, wherein the one or more bindings include at least one binding having a source identifier for a one of the first node or the second node, a destination identifier for another one of the first node or the second node, and a destination identifier for the particular intelligent node; and
(c) redirecting the data to the particular intelligent node based on the retained one or more bindings.

15. An apparatus as recited in claim 14, wherein the service includes encryption, data tapping, or data migration.

16. An apparatus as recited in claim 14, wherein the first node is in the form of a host and the second node is in the form of a storage area device.

17. An apparatus as recited in claim 16, wherein the host is defined as an initiator and the storage area node is defined as a target.

18. An apparatus as recited in claim 16, wherein the first network device is associated with the storage area device and the one or more bindings include (i) a first binding having a source identifier for the host, a destination identifier for the storage area device, and a destination identifier for the particular intelligent node and (ii) a second binding having a source identifier for the storage area device, a destination identifier for the host and a destination identifier for the particular intelligent node.

19. An apparatus as recited in claim 18, wherein the at least one of the processors and memory are further adapted for propagating the first and second bindings to all network devices in the storage area network.

20. An apparatus as recited in claim 19, wherein such propagation is accomplished utilizing a Cisco Fabric Services (CFS) protocol.

21. An apparatus as recited in claim 16, wherein the first network device is associated with the storage device and the bindings for the request includes only a single binding having a source identifier for the storage device, a destination identifier for the host, and a destination identifier for the particular intelligent node.

22. An apparatus as recited in claim 16, wherein the first network device is associated with the host and the bindings for the request include only a single binding having a source identifier for the storage device, a destination identifier for the host, and a destination identifier for the particular intelligent node.

23. An apparatus as recited in claim 14, wherein the redirection is accomplished transparently with respect to the first and second nodes without significantly reconfiguring the existing infrastructure that is present between the first and second nodes.

24. An apparatus as recited in claim 14, wherein a Fibre Channel protocol is implemented in the storage area network and the redirection is accomplished without rewiring of the storage area network's fabric, configuring a new zone for such fabric, or configuring a new virtual storage area network (VSAN) arrangement.

25. An apparatus as recited in claim 14, wherein the request is received from a second network device so as to redirect data to such second network device and the identifier for the particular intelligent node equals an identifier of such second network device.

26. An apparatus as recited in claim 14, wherein the request is received from a second network device that is a separate device from the particular intelligent node.

27. A system for redirecting data that is being transmitted between two or more nodes via a network devices of a storage area network, comprising:

a storage area network (SAN) having a plurality of network devices and plurality of targets which are each accessible by one or more hosts through at least one of the network devices; and an intelligent device for implementing a service on traffic between a particular host and a particular target and that is configured with a virtual host and virtual target pair corresponding to the particular host and the particular target, wherein the intelligent device is operable to:

send a request to a target network device of the plurality of network devices, which is coupled to the particular target, wherein the request is to redirect traffic destined for the particular target to the intelligent device, wherein the request includes an identifier for each of the particular host, the particular target, and the intelligent device, wherein the target network device is operable to receive the request and retain one or more bindings for the requested redirection, wherein the one or more bindings include at least one binding having a source identifier for the particular host or the particular target, a destination identifier for another one of the particular host or the particular target, and a destination identifier for the intelligent device;

wherein the intelligent device is further operable to:
receive traffic that is redirected from the particular target;
facilitate a service for such redirected traffic; and
forward the serviced traffic back to the particular host.

28. An apparatus for providing a service with respect to data that is being transmitted between two or more nodes via a target network device of a storage area network (SAN), comprising:

one or more processors;
one or more memory, wherein at least one of the processors and memory are adapted for:
sending a request to a target network device to cause the target network device to redirect traffic between a first host and a first target in a storage area network, wherein the traffic destined for a first target is redirected to the apparatus, wherein the request includes an identifier for each of the first host, the first target, and the apparatus;

receiving first data from the first host by the target network device and redirecting the first data which is destined for the first target to the apparatus; wherein
facilitating a service for the first data by the apparatus; and
forwarding the first data from the apparatus to the first target after the service is facilitated for the first data.

29. An apparatus as recited in claim 28, wherein facilitating a service for such redirected first data is accomplished by sending the first data to a second apparatus for performing the service and receiving the first data again after the service has been performed by the second apparatus.

30. A apparatus for redirecting data that is being transmitted between two or more nodes via a network device of a storage area network, comprising:

(a) means for receiving a request to redirect data that is transmitted between a first node and a second node in a storage area network, wherein the data destined for the second node is redirected to a particular intelligent node, wherein the particular intelligent node is configured to implement a service on the redirected data or forward the redirected data to another node that implements such service, wherein the request includes an identifier for each of the first node, the second node, and the particular intelligent node;

(b) means for retaining one or more bindings for the requested redirection based on the received identifiers for the first node, the second node, and the particular intelligent node, wherein the one or more bindings are associated with the received identifiers for the for the first node, the second node and the particular intelligent node, wherein the one or more bindings include at least one binding having a source identifier for a one of the first node or the second node, a destination identifier for another one of the first node or the second node, and a destination identifier for the particular intelligent node; and (c) means for redirecting the data to the particular intelligent node based on the retained one or more bindings.

* * * * *